United States Patent [19]

Muratani et al.

[11] 3,829,777

[45] Aug. 13, 1974

[54] CONTROL SYSTEM FOR DIVERSITY TRANSMISSION IN A TERRESTRIAL STATION OF SATELLITE COMMUNICATION

[75] Inventors: Takuro Muratani; Hideki Saito; Tatsuo Watanabe, all of Tokyo, Japan

[73] Assignee: Kokusai Denshin Denwa Kabushiki Kaisha, Tokyo-To, Japan

[22] Filed: Feb. 2, 1973

[21] Appl. No.: 329,206

[30] Foreign Application Priority Data

Feb. 10, 1972 Japan ............................... 47-13976

[52] U.S. Cl. ......................... 325/4, 325/41, 325/56, 179/15 BS

[51] Int. Cl. ............................................ H04b 7/20

[58] Field of Search ............... 325/4, 15, 56, 41, 42; 179/15 A, 15 BA, 15 BS; 343/5 LC; 178/50

[56] References Cited

UNITED STATES PATENTS

| | | | |
|---|---|---|---|
| 3,562,432 | 2/1971 | Gabbard | 325/15 X |
| 3,649,764 | 3/1972 | Maillet | 179/15 BA |
| 3,654,395 | 4/1972 | Schmidt | 325/4 X |

*Primary Examiner*—Benedict V. Safourek
*Attorney, Agent, or Firm*—Robert E. Burns; Emmanuel J. Lobato; Bruce L. Adams

[57] ABSTRACT

A control system for diversity transmission from a terrestrial station which performs time-division multiple access to a satellite communication repeater through a selected one of a plurality of transmission paths established between the satellite and the terrestrial station, in which the transmission paths are alternately selected in synchronism with a signal received over a selected one of the transmission paths when the error rate of all the transmission paths is lower than a reference threshold value, and in which a selected one of the transmission paths having the lowest error rate is continuously used when the error rates of the transmission paths are not all lower than the reference threshold value.

3 Claims, 6 Drawing Figures

CONTROL SYSTEM FOR DIVERSITY TRANSMISSION IN A TERRESTRIAL STATION OF SATELLITE COMMUNICATION

This invention relates to a control system for diversity transmission at a terrestrial station in a time-division multiple access satellite communication system.

Conventional satellite communication systems chiefly employ carrier frequencies below 10GHz and, in this frequency band, attenuation of transmitted and received signals due to a rainfall is small. It is possible to obtain a communication system of practically sufficient reliability by providing one set of a transmitting equipment and a receiving equipment at a terrestrial station. However, in accordance with a recent increase in the demand for communication, the use of carrier frequencies above 10GHz is also considered to meet with the demand but, in such a frequency range, attenuation of transmitted and received signals is marked when the intensity of a rainfall is high. Therefore, it is necessary to take some measures for securing necessary reliability of the communication system. Route diversity utilizing the locality of rainfalls is considered as one of the most usuful means of solving this problem. In this system, a plurality of transmitting equipments and receiving equipments are prepared for transmitting the same information, and antennas connected to the equipments are spaced at a sufficiently long distance so as to make the correlation between the rainfall amounts of respective antenna positions sufficiently small. Moreover, one of a plurality of transmitting and receiving routes, in which the deterioriation of signals is less than that in the other routes, is employed for transmitting the information. Another advantage of the route diversity system is that since each of the plurality of sets of transmitting equipments and receiving equipments can be used as auxiliary sets to the other ones, it is possible not only to prevent lowering of the reliability of the communication system due to attenuation by a rainfall but also to avoid troubles when any of the apapratus is out of order. In a case where such a route diversity system is applied to the time-division multiple access system in the satellite communication system, the most important requirement of a control system for diversity transmission is that in the case of stopping the power of an activating transmitter and then starting communication by another transmitter, switching between the two sets can be completed in an extremely short time. In the time-division multiple access system, the timings of transmitted waves from the transmitter of a terrestrial station are synchronized with a timing which is determined on a satellite communication repeater. Therefore, in order to newly transmit sending waves, it is usually necessary for determining the timing of the sending wave to measure the distance between the terrestrial station and the satellite, that is, to measure the phase difference therebetween by a so-called low level access. However, this measurement of the distance requires a considerable amount of time, for example, several seconds. In this case, if the activating transmitter suddenly gets out of order before the above mentioned switching, the communication circuit is disconnected, so that it is impossible to construct a communication circuit of high reliability.

An object of this invention is to provide a control system for diversity transmission at a terrestrial station of the time-division multiple access satellite communication system, which is free from the defects experienced in the prior art and minimizes omission of transmitted information or completely prevents the omission or erroneous repetition of the information in the case of selecting one of the routes.

A first feature of this invention is a fact that each set of a transmitter and a receiver is provided with a circuit for monitoring the transmission quality of each route and a transmitting time control device for controlling respective sending times of transmitting signals at predetermed timings.

A second feature of this invention is the provision of a switching circuit for alternately selecting one of respective transmission paths.

A third feature of this invention is a fact that the switching circuit is controlled in accordance with the output of the transmission quality monitoring circuit so that the transmission paths of excellent quality are used on a predetermined cycle in a time-divisional manner, thereby to transmit sending waves at instants in synchronism with the output timing of the transmitting time control device.

The principle, construction and operations of this invention will be clearly understood from the following detailed description taken in conjunction with the accompanying drawings, in which.

Figure 1:
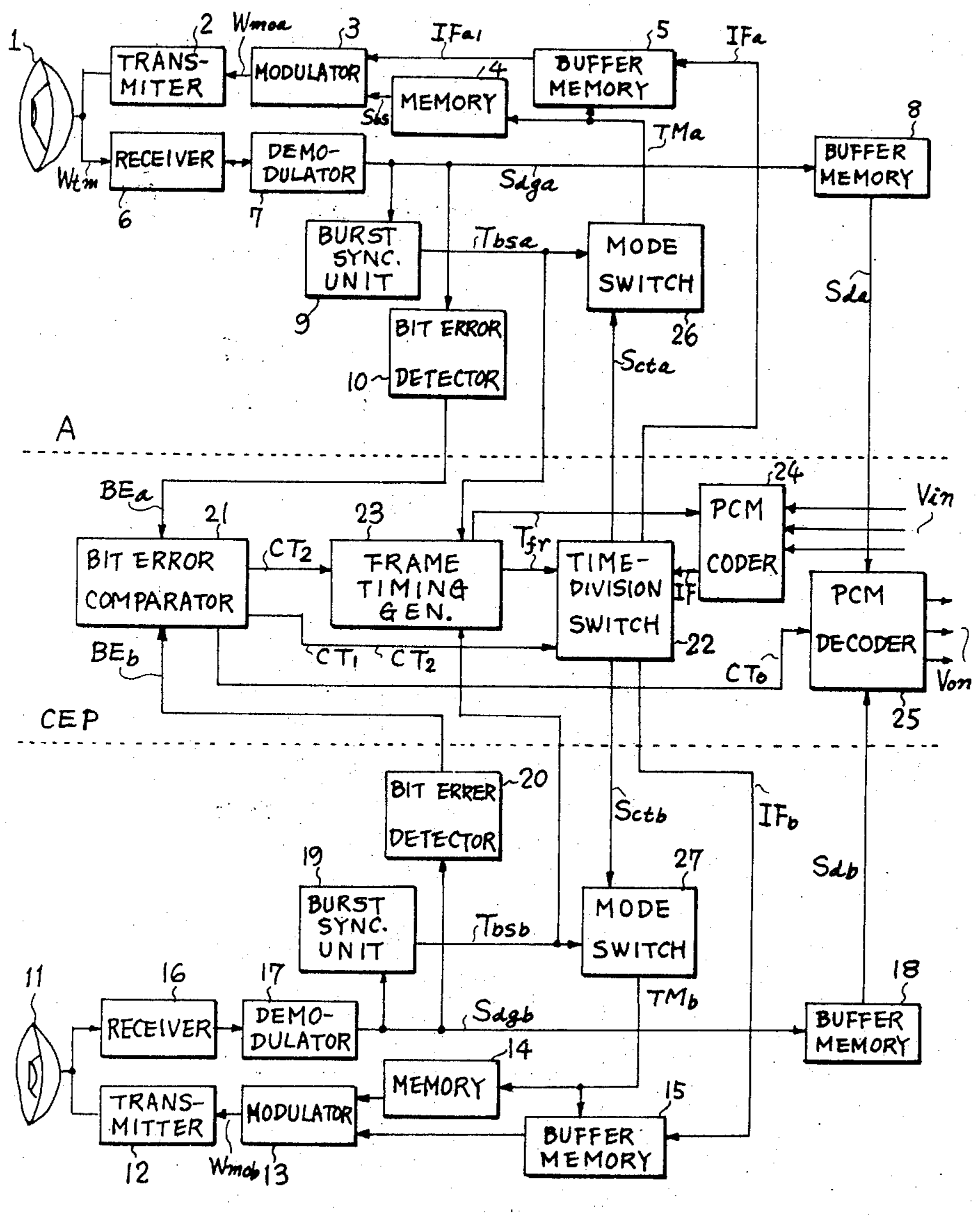
FIG. 1 is a block diagram illustrating an embodiment of this invention.

FIG. 1 illustrates an example of this invention applied to a terrestrial station, which is provided with two antennas A and B and two sets of transmitting and receiving equipments, and which achieve PCM time-division multiple access satellite communication for audio signals. The antenna sites A and B are sufficiently spaced apart from each other so as to decrease the correlation between rain-fall amounts thereof and they are connected by land lines to a central control equipment CEP of the terrestrial station. The antenna sites A and B are identical in construction with each other, and reference numerals 1, 2, . . . 10 and 26 correspond to those 11, 12, . . . 20 and 27 respectively. A description will be given of the antenna site A. A reference numeral 1 indicates an antenna common for transmission and reception, 2 a transmitter and 3 a modulator for, for example, phase-modulating an input digital signal to obtain a modulated wave suitable for radio transmission, which modulator includes a gate circuit for providing at its output side a modulated wave of a predetermined burst length at an instant determined by a transmission timing signal TMa. A reference numeral 4 designates a memory circuit, which receives the sending-out timing signal TMa to supply a control signal Sbs of a predetermined burst length to the modulator 3, and by which the burst ength (the length of the transmitted signal) is determined. A reference numeral 5 represents a buffer memory, which receives from the central control equipment CEP information IF*a* to be transmitted, and in which the information temporarily stored therein is read out in response to the transmission timing signal TMa. The audio information IF*a*, which is digitalized by the components 2 to 5, is transmitted in the form of a modulated wave of the predetermined burst length from the antenna 1 towards a satellite communication repeater at a predetermined instant.

Figure 5:
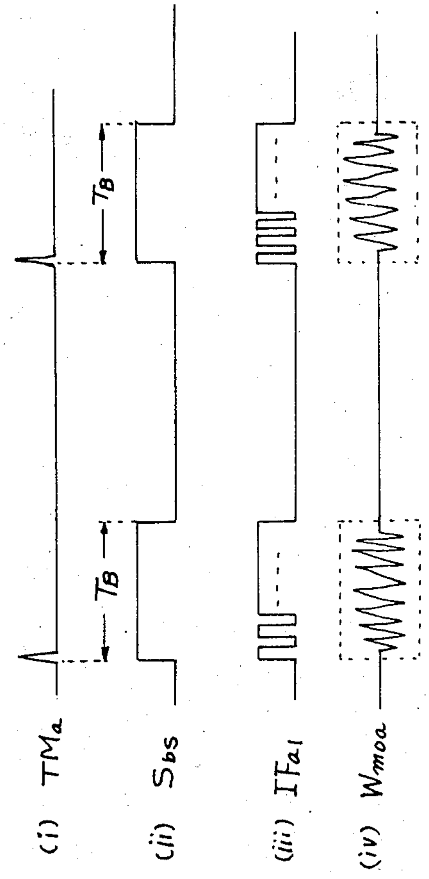

In FIG. 5 showing a time chart, for explaining the operation of the transmitting side, (i) shows the output from a mode switch 26 described later, that is, the sending-out timing signal TMa, and (ii) shows the output of the burst length memory 4 which is started by the sending-out timing signal TMa to provide a control signal Sbs of a length $T_B$, that is, a predetermined burst length. The modulator 3 is supplied with the output information of the buffer memory 5, that is, a rectangular wave $IF_{al}$ shown in FIG. 5 (iii) and that of the memory 4, that is, a rectangular wave Sbs of FIG. 5 (ii). In the modulator 3, a carrier generated from a carrier generator not shown is modulated by the output of the memory 5 and, at the same time, the modulated wave is gated by the output of the memory 4, thus obtaining at the output of the modulator 3 such a modulated wave Wmoa of the length $T_B$ as shown in FIG. 5 (iv).

A reference numeral 6 designates a receiver which receives a time-division modulated wave Wtm from each station, and 7 a demodulator for obtaining a digital signal Sdga from the modulated wave Wtm. A reference numeral 8 indicates a buffer memory having a speed conversion function, which is necessary for transmitting the digital signal Sdga to the central control equipment CEP as a converted digital signal Sda. A reference numeral 9 identifies a burst synchronization unit, which detects a burst synchronizing signal Tbss of a reference terrestrial station and that Tbsa of the self-terrestrial station transmitted from the antenna A and controls the transmission timing so that the time difference between the burst synchronizing signals Tbss and Tbsa may be at a predetermined value. (Refer to, for example, IEEE Transaction on Communication Technology, vol. COM-16, No. 4, August 1968,P589 – P596, O. G. Gabbord "Design of a satellite time - division multiple access burst synchronizer" and U.S. Pat. No. 3,654,395). A reference numeral 26 represents a mode switch, which receives the timing signal Tbsa from the burst synchronization unit 9. This mode switch 26 derives therefrom a timing signal as the transmission timing signal TMa when the transmission route B is not used, but stops the timing signal therein when the transmission route A is not used, and moreover derives therefrom a transmission timing pulse corresponding to the frame in the case of using the route A when the routes A and B are alternately used. This control in the mode switch 26 is achieved by a control signal Scta supplied from a time division switch 22. The mode switch 26 can be composed of an AND gate controlled by the output Tbsa of the burst synchronization unit 9 and the output Scta of the time division switch 22. A mode switch 27 of the route B performs operations similar to those of the above-mentioned mode switch 26, and the control signal Stcb therefor may be an inverted signal of the output Scta of the time division switch 22. A reference numeral 10 indicates a bit error detector, which detects from the demodulated digital signal Sdga a synchronizing signal transmitted from the self-terrestrial station to measure the bit error rate. The measured result BEa is applied to a bit error comparator 21 together with the measured result BEb of a bit error rate detector 20 against a synchronizing signal contained in a digital signal Sdgb received by the antenna B. The outputs (CT1 and CT2) of the bit error comparator 21 is used for controlling the time division switch 22. A reference numeral 23 represents a frame timing generator, which receives the transmission timing signals Tbsa and Tbsb from the both routes A and B to generate a frame timing signal Tfr. This frame timing signal Tfr is used for controlling the time division switch 22 and as a frame timing pulse of a PCM coder 24 for the pulse code modulation of audio inputs Vin thereto. A reference numeral 25 identifies a PCM coder, which receives outputs Sda and Sdb of the buffer memories 8 and 18 and selects therefrom the PCM code of better quality with reference to the output CTo of the bit error comparator 21 to decode it into voice information, thereby deriving at its output electrical voice signals Von.

In the construction described above, the components 10, 20 and 21 correspond to means for monitoring the transmission quality of the transmission path according to this invention, while the switch 22 is switch means provide in accordance with this invention. Further, the components 4, 9 and 23 or the components 14, 19 and 23 constitute the transmission timing control means according to this invention. These circuits will be described in detail below.

The bit error detectors 10 and 20 are known, per se, and error pulses BEa and BEb are derived at their outputs. The bit error comparator 21 produces two outputs by the use of the error pulses.

Figure 2:
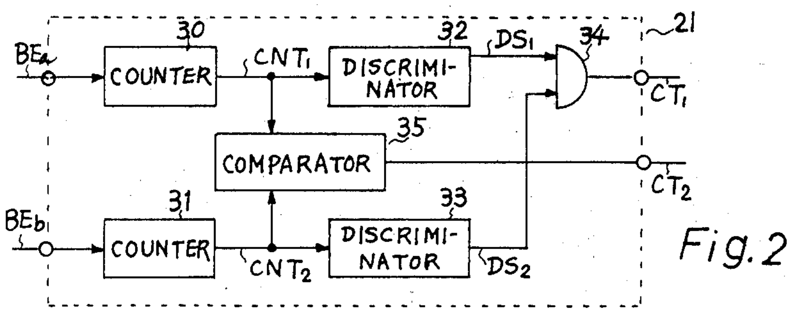
FIG. 2 is a block diagram illustrating an example of a bit-error rate detector employed in this invention.

An example of the bit error comparator 21 is shown in FIG. 2. Two inputs of this circuit 21 are error pulse trains BEa and Beb from the both antenna sites A and B, and the error pulses BEa and BEb are respectively counted by counters 30 and 31 for a certain period of time. The counted results are discriminated in magnitude by discriminators 32 and 33 respectively. Namely, the threshold values of the discriminators 32 and 33 are determined such that their output signals DS1 and DS2 assume a level "1" if the counted results CNT1 and CNT2 converted, for example, into the bit error rate are less than a value of $10^{-4}$, and such that their output signals DS1 and DS2 assume a level "0" if the counted results CNT1 and CNT2 are more than a value of $10^{-4}$. The outputs DS1 and DS2 of the discriminators 32 and 33 are supplied to an AND gate 34 to provide a first output CT1, which assumes the level "1" or "0" according to whether or not the bit error rates of the routes A and B are both less than $10^{-4}$. Further, the outputs CNT1 and CNT2 of the two counters 30 and 31 are compared with each other in magnitude by a comparator 35, which provides as a second output CT2 an output of the level "1" or "0" according to whether the counted value of the route A is smaller or larger than that of the other.

Figure 3:
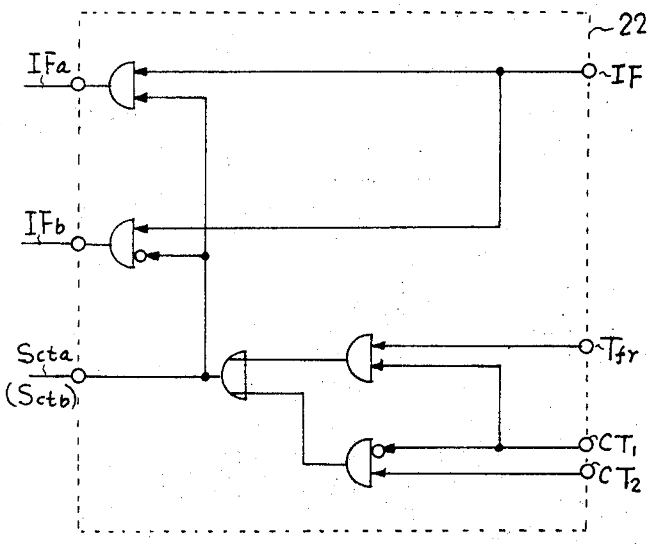
FIG. 3 is a block diagram illustrating an example of a time-division switch employed in this invention.

With reference to FIG. 3, the time division switch 22 is a switch, which is controlled by the two outputs CT1 and CT2 of the bit error comparator 21 and by the frame timing signal Tfr derived from the frame timing generator 23, and which has a function of supplying the PCM signal IF as the signal IFa or IFb to either one of the antenna sites A and B. When the length of one frame of the illustrated time-division multiple access signal is 125 microseconds, the time division switch 22 is so controlled as to provide, for example, the following outputs.

(i) If the first output CT1 of the bit error comparator 21 assumes the level "1", the time division switch 22 supplies the PCM signal IF to the antenna sites A and B alternately every frame.

(ii) If the first output CT1 of the comparator 21 assumes the level "0" and the second output CT2 thereof assumes the level "1", the switch 22 applies the PCM signal IF to the antenna site A every frame.

(iii) If the first and second outputs CT1 and CT2 of the comparator 21 both assume the level "0", the switch 22 supplies the PCM signal IF to the antenna site B every frame.

Figure 6:
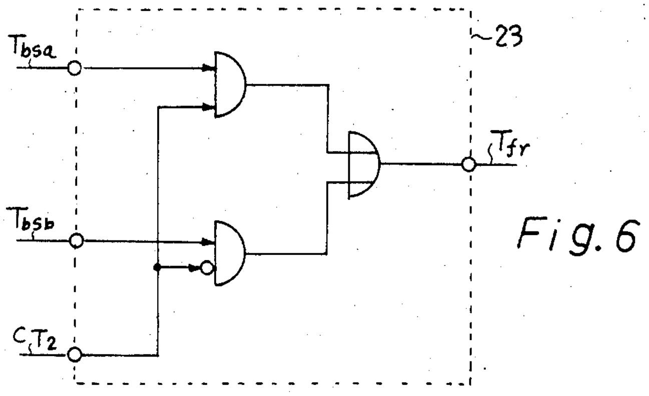
FIG. 6 is a block diagram illustrating an example of a frame-timing generator employed in this invention.

With reference to FIG. 6, the frame timing generator 23 is a circuit, which receives the transmission timing Tbsa and Tbsb of the routes A and B, and which selects the transmission timing of either the transmitting equipment in A or B; whichever corresponds to the lower error rate. The output of this circuit is used as the frame timing pulse Tfr for the PCM coder 24 and, further, it is applied to the time division switch 22 and used as the timing pulse Tfr for switching the PCM signal IF. In FIG. 6 showing the frame timing generator 23, the transmission timing signals Tbsa and Tbsb from the antenna sites A and B are gated in response to the second output CT2 of the bit error comparator 21. If the second output Ct2 assumes the level "1", that is, the receiving condition of the route A is better than that of the route B, the sending-out timing Tbsa of the route A is employed as the frame timing Tfr. However, if the receiving condition of the route B is better than that of the other route a, the sending-out timing Tbsb of the route B is employed. This eliminates the possibility that the timing signal of the noncommunicating route is used as the frame timing Tfr.

FIG. 3 illustrates an example of the concrete circuit construction of the switch 22. In FIG. 3, first and second inputs correspond to the first and second outputs CT1 and CT2 of the bit error comparator 21 respectively. The frame timing pulse Tfr derived from the frame timing generator 23 has a duty cycle of 50 percent and it is a repetition pulse train of 4KHz. Further, the PCM data IF from the PCM coder 25 is a multiple PCM signal to be transmitted from the self-terrestrial station. The outputs of the time-division switch 22 applied to the buffer memories 5 and 15 are PCM data IFa and IFb. The switch 22 is controlled by the output of the bit error comparator 21 as described above.

Figure 4:
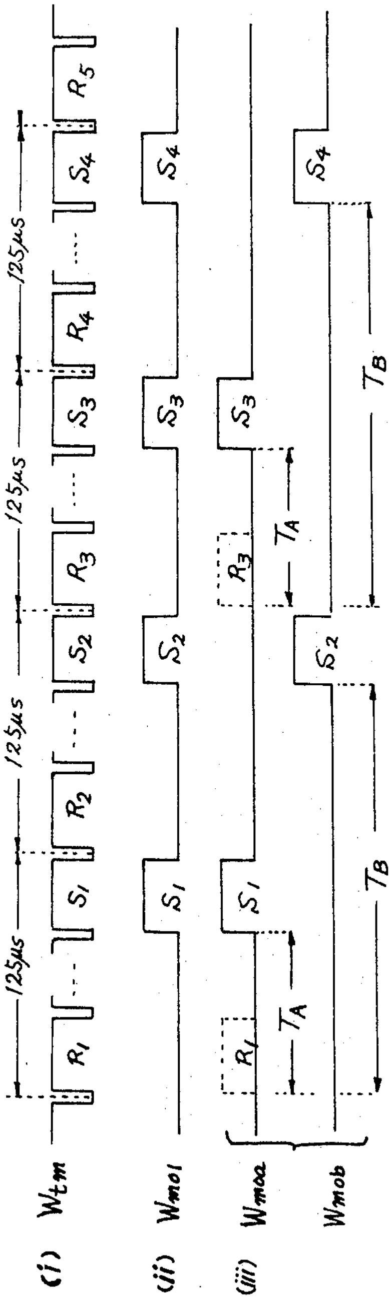
FIGS. 4 and 5 are time charts explanatory of the operations of this invention.

In such a control system for diversity transmission according to this invention, the transmitted signal and the received signal become such, for example, as shown in FIG. 4. In FIG. 4, (i) shows a received signal, and reference characters $R_1$, $R_2$, . . . represent reference station signals while $S_1$, $S_2$, . . . represent transmitted signals reflected back from a satellite. One frame is 125 microseconds in terms of the reciprocal of a sampling frequency of 8 KHz. Signals (ii) and (iii) show transmitted signals Wmo1 and Wmo2 (Wmoa, Wmob) from the self-terrestrial station. The signal Wmo1 (ii) shows the waveform of the signal which is transmitted from either antenna site A or B of the self-terrestrial station every frame. The transmission timing for the signals $S_1$, $S_2$, . . . is controlled based on the received signal Wtm (i) in such a manner that the signals $R_1$ and $S_1$, $R_2$ and $S_2$, . . . may have predetermined time differences therebetween respectively. Such a mode of transmission is used when the route corresponding to either one of the transmitting equipments A and B is in poor condition while only the other route is selected.

The transmitted signal Wmoa on the upper side in the signals (iii) is a signal transmitted, for example, from the transmitting equipment A, and the lower one Wmob is a signal transmitted from the transmitting equipment B. The timing of transmitting the upper signal Wmoa is controlled by the burst synchronizing device of the antenna site A so that the signals $S_1$, $S_3$, $S_5$, . . . may have a time difference $T_A$ between them and those $R_1$, $R_3$, $R_5$, . . . respectively. On the other hand, the timing of transmitting the lower signal Wmob is controlled by the burst synchronizing device of the antenna site B so that the signals $S_2$, $S_4$, . . . may have a time difference $T_B$ ($=T_A$+125 us) between them and those $R_1$, $R_3$, $R_5$, . . . respectively. Such a transmission mode is adopted in a case where the routes A and B are both good in transmission quality. In this case, the both transmitting equipments A and B are alternately used in a time-divisional manner every other frame. If the circuit condition of either one of the routes A and B becomes deteriorated, or if either one of the routes A and B cannot be used because of a trouble in the transmitter or in the receiver, communication can immediately be continued by switching the transmission mode from the state (iii) to the state (ii), thus ensuring to minimize or eliminate a disconnection of the communication. The transmission mode is restored from the state (ii) to the state (iii) after the circuit conditions of the both routes A and B have become well recovered. Namely, in order to recover the route through which communication has not been effected, it is necessary to measure the distance between the terrestrial station and the satellite by the use of a signal of a level well lower than the signal wave and to transmit the signal wave in accordance with the mode (iii), so that a certain period of time (about 5 seconds, for example,) is required. However, no trouble occurs because the transmission mode is restored after the circuit conditions have become well recovered.

While the present invention has been described in connection with the terrestrial station equipped with the two antennas A and B, the present invention can also be applied to terrestrial stations having more than three antennas by adapting a bit error comparator, a time division switch and a frame timing generator for use with more than three terrestrial stations.

Although the foregoing example is adapted so that the transmission quality of the transmission path is monitored by detecting the quality of the received signal by utilizing the correlation between the transmitting and receiving paths, it is also possible to receive from another terrestrial station of the same party the quality of the transmission path by utilizing the monitoring device of the party station.

By the use of the control system for diversity transmission according to this invention, a plurality of routes are used on a time-divisional bases in the diversity transmission system for PCM time-division multiple access satellite communication. Moreover, if one of the routes becomes disconnected, the transmitting function is immediately switched to another route to minimize or eliminate loss of the transmitted signal, as has been described in detail in the foregoing. Accordingly, it is possible to obtain a diversity transmission control device of extremely high performance in accordance with this invention.

What we claim is:

1. In a control system for controlling diversity transmission between a satellite communications repeater and a terrestrial station having a plurality of antennas establishing separate signal paths between the terrestrial station and the satellite for providing time-division multiple access to the satellite repeater, wherein the improvement comprises:

a. error rate monitor means at said terrestrial station for developing a plurality of error rate signals each representative of an error rate of a corresponding one of said signal paths;

b. comparison means at said terrestrial station developing in response to said error rate signals a first output signal when the error rate of all of said signal paths are lower than a predetermined reference rate and developing a second output signal indicating which of said signal paths has the lowest error rate;

c. means applying said error rate signals to said comparison means;

d. timing means receptive of said comparison means second output signal for developing timing signals synchronized with signals received at said terrestrial station over said signal path having the lowest error rate;

e. means applying said comparison means second output signal to said timing means;

f. switch means in said terrestrial station receptive of said timing signals and said comparison means first and second output signals for alternately selecting each of said signal paths for transmission in synchronism with said timing signals thereover to said satellite repeater in response to said comparison means first output signal, and for selecting said signal path having the lowest error rate for transmission in synchronism with said timing signals thereover to said satellite repeater in response to said comparison means second output signal in the absence of said comparison means first output signal; and g. means applying said timing signals and said comparison means first and second output signals to said switch means.

2. A control system for diversity transmission according to claim 1, in which said error rate monitor means comprises a bit-error detector for each of said signal paths for developing error pulses equal in number to the number of bit errors occurring over a corresponding one of said signal paths.

3. A control system for diversity transmission according to claim 2, in which the comparison means comprises a plurality of counters respectively counting in a predetermined time said error pulses from said bit-error detectors, a plurality of discriminators each connected to a corresponding one of the counters for each providing an output when the counting state of the corresponding counter exceeds a threshold value, an AND circuit connected to all of said discriminators for providing said first output, and a comparator connected to said counters for providing said second output.

* * * * *